(12) United States Patent
Long et al.

(10) Patent No.: US 10,111,207 B2
(45) Date of Patent: Oct. 23, 2018

(54) NETWORK DEVICE, TERMINAL DEVICE, AND VOICE SERVICE CONTROL METHOD

(71) Applicant: Huawei Technologies Co., Ltd., Shenzhen (CN)

(72) Inventors: Xiaoqiong Long, Shanghai (CN); Qiang Yuan, Shanghai (CN); Chunjie Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 15/148,117

(22) Filed: May 6, 2016

(65) Prior Publication Data
US 2016/0255614 A1 Sep. 1, 2016

Related U.S. Application Data

(63) Continuation of application No. PCT/CN2013/086687, filed on Nov. 7, 2013.

(51) Int. Cl.
| | |
|---|---|
| *H04W 72/04* | (2009.01) |
| *H04L 12/40* | (2006.01) |
| *H04L 12/26* | (2006.01) |
| *H04W 76/30* | (2018.01) |
| *H04W 76/28* | (2018.01) |
| *H04W 76/38* | (2018.01) |

(52) U.S. Cl.
CPC ......... *H04W 72/0406* (2013.01); *H04L 12/40* (2013.01); *H04L 43/16* (2013.01); *H04W 76/28* (2018.02); *H04W 76/30* (2018.02); *H04W 76/38* (2018.02)

(58) Field of Classification Search
None
See application file for complete search history.

(56) References Cited

U.S. PATENT DOCUMENTS

| 8,521,132 B2 | 8/2013 | Washio |
| 2005/0130367 A1* | 6/2005 | Lee .................. H01L 27/10855 438/238 |

(Continued)

FOREIGN PATENT DOCUMENTS

| CN | 1988708 A | 6/2007 |
| CN | 101106827 A | 1/2008 |

(Continued)

OTHER PUBLICATIONS

"3rd Generation Partnership Project; Technical Specification Group Services and System Aspects; Speech codec Speech Processing Functions; Adaptive Multi-Rate—Wideband (AMR-WB) Speech codec; Source Controlled Rate Operation (Release 11)," 3GPP TS 26.193 V11.0.0, Sep. 2012, 21 pages.

*Primary Examiner* — Chi H Pham
*Assistant Examiner* — Vladislav Agureyev
(74) *Attorney, Agent, or Firm* — Slater Matsil, LLP

(57) ABSTRACT

The present invention relates to a network device, a terminal device, and a voice service control method, a frame type of voice data is determined, and therefore, a voice service of the network device may be disconnected when no speech frame time exceeds set time, which prevents an economic loss caused by a non-talking call maintained for a long time, thereby saving a resource of an operator network, and improving utilization efficiency of the operator network.

16 Claims, 8 Drawing Sheets

---

A terminal device detects, within a set time length range, whether a speech frame exists in uplink and downlink voice data of the terminal device with a voice service in a connected state — S210

The terminal device disconnects from the voice service in a case in which the voice frame does not exist in the uplink and downlink voice data within the set time length range. — S220

(56) References Cited

U.S. PATENT DOCUMENTS

| | | | |
|---|---|---|---|
| 2006/0120318 A1* | 6/2006 | Shah | H04W 76/06 |
| | | | 370/328 |
| 2006/0211428 A1* | 9/2006 | Shuto | H04W 72/08 |
| | | | 455/450 |
| 2006/0274703 A1* | 12/2006 | Connelly | H04L 41/0622 |
| | | | 370/338 |
| 2007/0010239 A1* | 1/2007 | Connelly | H04M 15/00 |
| | | | 455/423 |
| 2007/0195815 A1* | 8/2007 | Turner | H04L 47/10 |
| | | | 370/465 |
| 2008/0107056 A1 | 5/2008 | Choi et al. | |
| 2009/0073959 A1* | 3/2009 | Xu | H04L 65/605 |
| | | | 370/352 |
| 2010/0177716 A1 | 7/2010 | Harada et al. | |
| 2010/0280823 A1* | 11/2010 | Shlomot | G10L 19/012 |
| | | | 704/201 |
| 2012/0297045 A1* | 11/2012 | Xie | H04M 1/656 |
| | | | 709/223 |
| 2015/0043391 A1* | 2/2015 | Yin | H04L 5/0092 |
| | | | 370/280 |
| 2015/0080048 A1 | 3/2015 | Fang et al. | |

FOREIGN PATENT DOCUMENTS

| | | | | |
|---|---|---|---|---|
| CN | 101507349 A | 8/2009 | | |
| CN | 102638612 A | 8/2012 | | |
| CN | 102647525 A | 8/2012 | | |
| CN | 102984814 | 3/2013 | | |
| EP | 1261176 A1 | 11/2002 | | |
| JP | 201123903 A | 3/2011 | | |
| WO | WO 2013155788 A1 * | 10/2013 | | H04M 1/72519 |

\* cited by examiner

NETWORK DEVICE, TERMINAL DEVICE, AND VOICE SERVICE CONTROL METHOD

This application is a continuation of International Application No. PCT/CN2013/086687, filed on Nov. 7, 2013, which is hereby incorporated by reference in its entirety.

TECHNICAL FIELD

The present invention relates to the field of communications technologies, and in particular, to a network device, a terminal device, and a voice service control method.

BACKGROUND

For a phone voice communication service, during a normal call, time of one party in talking with and silently listening to the other party is evenly split. During a non-talking period, to prevent causing a feeling of call interruption to the other party, a discontinuous transmission (DTX) technology is used. A party in silence sends a silence insertion descriptor (SID) for describing background noise, and the background noise is recovered on a receive end according to the silence insertion descriptor.

In a case in which no actual voice data exists, a call connection may be maintained by sending a silence insertion descriptor periodically. However, in a certain situation, it is unreasonable to maintain a call connection by using a silence insertion descriptor. For example, in a case in which both parties forget to hang up, a non-talking call is retained for a long time, so that a risk of a "costly bill" and a dispute are caused, thereby wasting a resource of an operator network, and reducing utilization efficiency of the operator network.

SUMMARY

Embodiments disclosed herein provide systems and methods for reasonably controlling a call connection of a voice service.

An embodiment provides a network device, including:

a detecting module, configured to detect, within a set time length range, whether a speech frame exists in uplink and downlink voice data of a terminal device with a voice service in a connected state; and a control module, communicating with the detecting module and configured to: in a case in which the detecting module detects that the speech frame does not exist in the uplink and downlink voice data within the set time length range, disconnect from the voice service of the terminal device.

With reference to the first aspect, in a first possible implementation manner, the detecting module includes:

a detecting unit, configured to: when the voice service of the terminal device starts, detect the uplink and downlink voice data;

a timing unit, communicating with the detecting unit and configured to: in a case in which the detecting unit detects that the speech frame does not exist in the uplink and downlink voice data, start a first timer, where the first timer is configured to count time in which the speech frame does not exist in the uplink and downlink voice data; and a determining unit, communicating with the timing unit and configured to determine whether first cumulative time of the first timer started by the timing unit exceeds a first threshold.

With reference to the first possible implementation manner of the first aspect, in a second possible implementation manner, the control module is specifically configured to:

in a case in which the determining unit determines that the first cumulative time exceeds the first threshold, disconnect from the voice service of the terminal device.

With reference to the first possible implementation manner of the first aspect, in a third possible implementation manner, the detecting module further includes:

a prompting unit, communicating with the determining unit and configured to: in a case in which the determining unit determines that the first cumulative time exceeds the first threshold, play a prompt tone and start a second timer, where the second timer is configured to count time in which the speech frame does not exist in the uplink and downlink voice data of the terminal device and a prompt has been made, where the determining unit is further configured to determine whether second cumulative time of the second timer started by the timing unit exceeds a second threshold; and the control module is further configured to: in a case in which the determining unit determines that the second cumulative time exceeds the second threshold, disconnect from the voice service of the terminal device.

According to a second aspect, a terminal device is provided, including:

a detecting module, configured to detect, within a set time length range, whether a speech frame exists in uplink and downlink voice data of the terminal device with a voice service in a connected state; and a control module, communicating with the detecting module and configured to: in a case in which the detecting module detects that the speech frame does not exist in the uplink and downlink voice data within the set time length range, disconnect from the voice service.

With reference to the second aspect, in a first possible implementation manner, the detecting module includes:

a detecting unit, configured to: when the voice service starts, detect the uplink and downlink voice data;

a timing unit, communicating with the detecting unit and configured to: in a case in which the detecting unit detects that the speech frame does not exist in the uplink and downlink voice data, start a first timer, where the first timer is configured to count time in which the speech frame does not exist in the uplink and downlink voice data; and a determining unit, communicating with the timing unit and configured to determine whether first cumulative time of the first timer started by the timing unit exceeds a first threshold.

With reference to the first possible implementation manner of the second aspect, in a second possible implementation manner, the control module is specifically configured to:

in a case in which the determining unit determines that the first cumulative time exceeds the first threshold, disconnect from the voice service.

With reference to the first possible implementation manner of the second aspect, in a third possible implementation manner, the detecting module further includes:

a prompting unit, communicating with the determining unit and configured to: in a case in which the determining unit determines that the first cumulative time exceeds the first threshold, play a prompt tone and instruct the timing unit to start a second timer, where the second timer is configured to count time in which the speech frame does not exist in the uplink and downlink voice data and a prompt has been made, where the determining unit is further configured to determine whether second cumulative time of the second timer started by the timing unit exceeds a second threshold; and the control module is further configured to: in a case in which the determining unit determines that the second cumulative time exceeds the second threshold, disconnect from the voice service.

According to a third aspect, a voice service control method includes:

detecting, by a network device, within a set time length range, whether a speech frame exists in uplink and downlink voice data of a terminal device with a voice service in a connected state; and disconnecting, by the network device, from the voice service of the terminal device in a case in which the speech frame does not exist in the uplink and downlink voice data within the set time length range.

With reference to the third aspect, in a first possible implementation manner, the detecting, by a network device, within a set time length range, whether a speech frame exists in uplink and downlink voice data of a terminal device with a voice service in a connected state includes:

detecting, by the network device, the uplink and downlink voice data when the voice service of the terminal device starts;

starting, by the network device, a first timer in a case in which the speech frame does not exist in the uplink and downlink voice data, where the first timer is configured to count time in which the speech frame does not exist in the uplink and downlink voice data; and determining whether first cumulative time of the first timer exceeds a first threshold.

With reference to the first possible implementation manner of the third aspect, in a second possible implementation manner, the disconnecting, by the network device, from the voice service of the terminal device in a case in which the speech frame does not exist in the uplink and downlink voice data within the set time length range includes:

disconnecting, by the network device, from the voice service of the terminal device in a case in which the first cumulative time exceeds the first threshold.

With reference to the first possible implementation manner of the third aspect, in a third possible implementation manner, the detecting, by a network device, within a set time length range, whether a speech frame exists in uplink and downlink voice data of a terminal device with a voice service in a connected state further includes:

playing, by the network device, a prompt tone and starting a second timer in a case in which the first cumulative time exceeds the first threshold, where the second timer is configured to count time in which the speech frame does not exist in the uplink and downlink voice data and a prompt has been made; and determining, by the network device, whether second cumulative time of the second timer exceeds a second threshold; and the disconnecting, by the network device, from the voice service of the terminal device in a case in which the speech frame does not exist in the uplink and downlink voice data within the set time length range includes:

disconnecting, by the network device, from the voice service of the terminal device in a case in which the second cumulative time exceeds the second threshold.

According to a fourth aspect, a voice service control method includes:

detecting, by a terminal device, within a set time length range, whether a speech frame exists in uplink and downlink voice data of the terminal device with a voice service in a connected state; and disconnecting, by the terminal device, from the voice service in a case in which the speech frame does not exist in the uplink and downlink voice data within the set time length range.

With reference to the fourth aspect, in a first possible implementation manner, the detecting, by a terminal device, within a set time length range, whether a speech frame exists in uplink and downlink voice data of the terminal device with a voice service in a connected state includes:

detecting, by the terminal device, the uplink and downlink voice data when the voice service starts;

starting, by the terminal device, a first timer in a case in which the speech frame does not exist in the uplink and downlink voice data, where the first timer is configured to count time in which the speech frame does not exist in the uplink and downlink voice data; and determining, by the terminal device, whether first cumulative time of the first timer exceeds a first threshold.

With reference to the first possible implementation manner of the fourth aspect, in a second possible implementation manner, the disconnecting, by the terminal device, from the voice service in a case in which the speech frame does not exist in the uplink and downlink voice data within the set time length range includes:

disconnecting, by the terminal device, from the voice service in a case in which the first cumulative time exceeds the first threshold.

With reference to the first possible implementation manner of the fourth aspect, in a third possible implementation manner, the detecting, by a terminal device, within a set time length range, whether a speech frame exists in uplink and downlink voice data of the terminal device with a voice service in a connected state further includes:

playing, by the terminal device, a prompt tone and starting a second timer in a case in which the first cumulative time exceeds the first threshold, where the second timer is configured to count time in which the speech frame does not exist in the uplink and downlink voice data of the terminal device and a prompt has been made; and determining, by the terminal device, whether second cumulative time of the second timer exceeds a second threshold; and the disconnecting, by the terminal device, from the voice service in a case in which the speech frame does not exist in the uplink and downlink voice data within the set time length range includes:

disconnecting, by the terminal device, from the voice service in a case in which the second cumulative time exceeds the second threshold.

In the network device, the terminal device, and the voice service control method according to embodiments, a frame type of voice data is determined, and therefore, a voice service of the network device may be disconnected when no speech frame time exceeds set time, which prevents an economic loss caused by a non-talking call maintained for a long time, thereby saving a resource of an operator network, and improving utilization efficiency of the operator network.

According to detailed descriptions of exemplary embodiments in the following accompanying drawings, other features and aspects of the embodiments become clear.

BRIEF DESCRIPTION OF THE DRAWINGS

Accompanying drawings included in and forming a part of the specification together with the specification show exemplary embodiments, features, and aspects of the disclosed embodiments, and are used to explain a principle of the present invention.

DETAILED DESCRIPTION OF ILLUSTRATIVE EMBODIMENTS

Figure 1A:
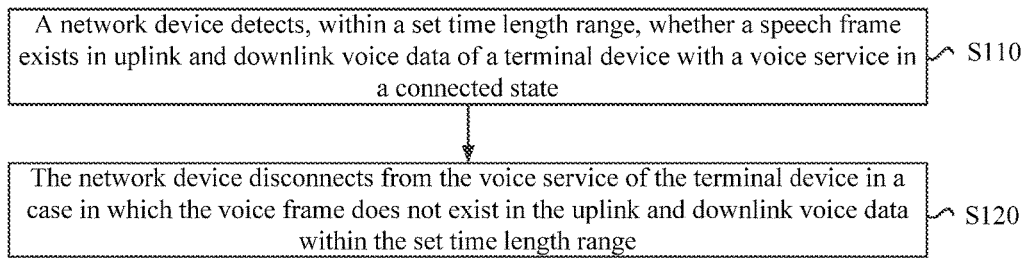
FIG. 1A is a flowchart of a voice service control method according to an embodiment.

The following describes exemplary embodiments, features, and aspects of the disclosure with reference to accompanying drawings in detail. Same reference numerals in the accompanying drawings represent components with a same or similar function. Each aspect of an embodiment is shown in the accompanying drawings, but unless otherwise specified, the accompanying drawings do not need to be drawn to scale.

The word "exemplary" for exclusive use herein means "used as an example or embodiment or for description." Any embodiment described herein for an "exemplary" purpose does not need to be explained as superior to or better than other embodiments.

In addition, to better describe the disclosed embodiments, various specific details are provided in the following specific implementation manners. A person skilled in the art should understand that, without a certain specific detail, the embodiments still can be implemented. In some other embodiments, methods, means, components, and circuits well known by a person skilled in the art are not described in detail, so that a main purpose of the embodiments is highlighted.

Embodiment 1

Figure 1B:
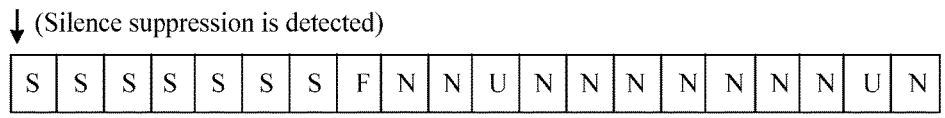
FIG. 1B is a schematic diagram of a sending time sequence of a silence insertion descriptor in the voice service control method according to an embodiment.

FIG. 1A is a flowchart of a voice service control method according to an embodiment. As shown in FIG. 1B, the voice service control method mainly includes:

Step S110: A network device detects, within a set time length range, whether a speech frame exists in uplink and downlink voice data of a terminal device with a voice service in a connected state.

Step S120: The network device disconnects from the voice service of the terminal device in a case in which the speech frame does not exist in the uplink and downlink voice data within the set time length range.

Specifically, on a communications network that supports a DTX function, a terminal device in a call connected state may send multiple types of frames, for example, a speech frame, a null frame, and a silence insertion descriptor. The terminal device or the network device (for example, a controller, a core network, or an LTE base station) may initiate detection for a non-talking call; and after it is detected that silence suppression starts, may send a non-speech frame such as a silence insertion descriptor or a null frame.

A silence insertion descriptor is used as an example. FIG. 1B is a schematic diagram of a sending time sequence of a silence insertion descriptor in the voice service control method according to an embodiment. As shown in FIG. 1B, each grid in the figure represents one frame sent in 20 ms. When it is detected that the silence suppression starts, a speech frame (English: SPEECH, S for short) continues to be sent in subsequent seven pieces of 20 milliseconds (English: millisecond, ms for short), a first silence insertion descriptor (English: SID_FIRST, F for short) with first 39 bits is sent in an eighth 20 ms, no frame (English: NO_DATA, N for short) is sent in next two consecutive pieces of 20 ms: a ninth 20 ms and a tenth 20 ms, a 39-bit update silence insertion descriptor (English: SID_UPDATE, U for short) starts to be sent in an eleventh 20 ms, then no frame is sent in next seven consecutive pieces of 20 ms, and finally a 39-bit silence insertion descriptor is sent again. After that, every eight pieces of 20 ms has one 39-bit silence insertion descriptor, and until a voice is detected in a certain 20 ms, a DTX state is immediately stopped from being sent and a speech frame starts to be sent.

The uplink and downlink voice data may include uplink voice data and downlink voice data, where the uplink voice data is voice data that is sent by the terminal device and received by the network device, and the downlink voice data is voice data sent by the network device to the terminal device.

Further, a timer may be used to control time of a non-talking call without a speech frame, and the following manners may be specifically included:

Manner 1: One timer is used.

When Manner 1 is used, step S110 may include:

Step A: The network device detects the uplink and downlink voice data when the voice service of the terminal device starts.

Step B: The network device starts a first timer in a case in which the speech frame does not exist in the uplink and downlink voice data, where the first timer is configured to count time in which the speech frame does not exist in the uplink and downlink voice data; and the network device determines whether first cumulative time of the first timer exceeds a first threshold.

Further, step 120 may include:

disconnecting, by the network device, from the voice service of the terminal device in a case in which the first cumulative time exceeds the first threshold.

Manner 2: Two timers are used.

When Manner 2 is used, step S110 may include the foregoing step A and step B, and after step B, step S110 may further include:

Step C: The network device plays a prompt tone and starts a second timer in a case in which the first cumulative time exceeds the first threshold, where the second timer is configured to count time in which the speech frame does not exist in the uplink and downlink voice data and a prompt has been made.

Step D: The network device determines whether second cumulative time of the second timer exceeds a second threshold.

In addition, step 120 may include:

disconnecting, by the network device, from the voice service of the terminal device in a case in which the second cumulative time exceeds the second threshold.

The voice service control method may be executed by a terminal device, and may also be executed by a network device. The voice service control method can be implemented as long as a module with a corresponding function is disposed on the terminal device and/or network device.

In the voice service control method according to this embodiment, a frame type of voice data is determined, and therefore, a voice service of a network device may be disconnected when no speech frame time exceeds set time, which prevents an economic loss caused by a non-talking call maintained for a long time, thereby saving a resource of an operator network, and improving utilization efficiency of the operator network.

Embodiment 2

Figure 2:
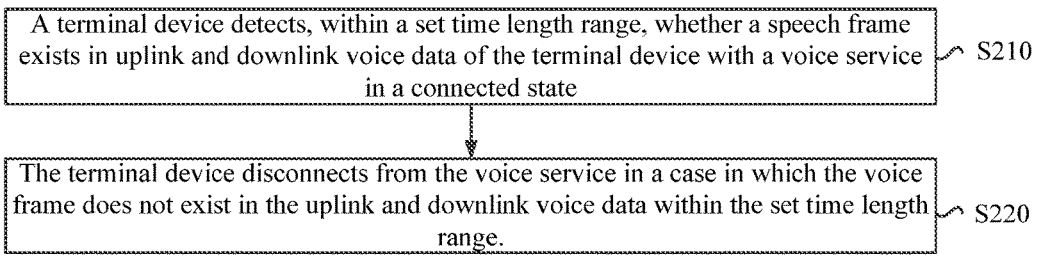
FIG. 2 is a flowchart of a voice service control method according to an embodiment.

FIG. 2 is a flowchart of a voice service control method according to an embodiment. As shown in FIG. 2, the voice service control method mainly includes:

Step S210: A terminal device detects, within a set time length range, whether a speech frame exists in uplink and downlink voice data of the terminal device with a voice service in a connected state.

Step S220: The terminal device disconnects from the voice service in a case in which the speech frame does not exist in the uplink and downlink voice data within the set time length range.

Specifically, on a communications network that supports a DTX function, a terminal device in a call connected state may send multiple types of frames, for example, a speech frame, a null frame, and a silence insertion descriptor. The terminal device or the network device (for example, a controller, a core network, or an LTE base station) may initiate detection for a non-talking call; and after it is detected that silence suppression starts, the terminal device or the network device may send a non-speech frame such as a silence insertion descriptor or a null frame.

The uplink and downlink voice data may include uplink voice data and downlink voice data, where the uplink voice data is voice data that is sent by the terminal device and received by the network device, and the downlink voice data is voice data sent by the network device to the terminal device.

Further, a timer may be used to control time of a non-talking call without a speech frame, and the following manners may be specifically included:

Manner 1: One timer is used.

When Manner 1 is used, step S110 may include:

Step A: The terminal device detects the uplink and downlink voice data when the voice service starts.

Step B: The terminal device starts a first timer in a case in which the speech frame does not exist in the uplink and downlink voice data, where the first timer is configured to count time in which the speech frame does not exist in the uplink and downlink voice data; and the terminal device determines whether first cumulative time of the first timer exceeds a first threshold.

Further, step 120 may include:

disconnecting, by the terminal device, from the voice service in a case in which the first cumulative time exceeds the first threshold.

Manner 2: Two timers are used.

When Manner 2 is used, step S110 may include the foregoing step A and step B, and after step B, step S110 may further include:

Step C: The terminal device plays a prompt tone and starts a second timer in a case in which the first cumulative time exceeds the first threshold, where the second timer is configured to count time in which the speech frame does not exist in the uplink and downlink voice data of the terminal device and a prompt has been made.

Step D: The terminal device determines whether second cumulative time of the second timer exceeds a second threshold.

In addition, step 120 may include:

disconnecting, by the terminal device, from the voice service in a case in which the second cumulative time exceeds the second threshold.

In the voice service control method according to this embodiment, a frame type of voice data is determined, and therefore, a voice service of a terminal device may be disconnected when no speech frame time exceeds set time, which prevents an economic loss caused by a non-talking call maintained for a long time, thereby saving a resource of an operator network, and improving utilization efficiency of the operator network.

Embodiment 3

Figure 3:
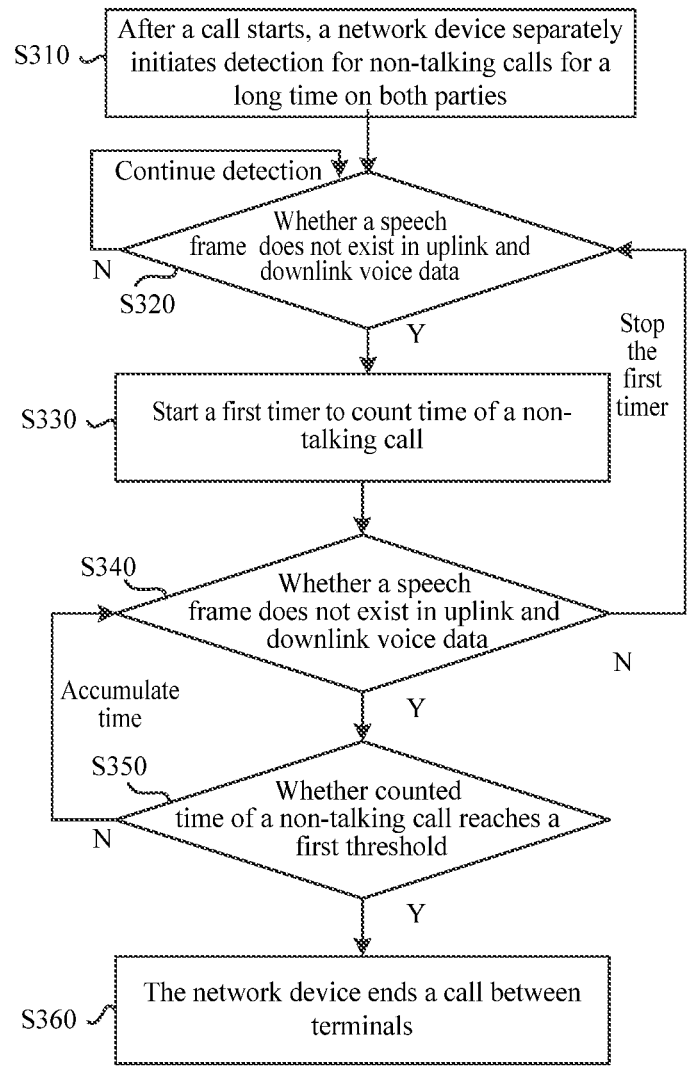
FIG. 3 is a flowchart of a voice service control method according to an embodiment.

FIG. 3 is a flowchart of a voice service control method according to. Based on Embodiment 1, that the voice service control method is executed on the network device in Manner 1 is used as an example. As shown in FIG. 3, the voice service control method mainly includes:

Step S310: After a call starts, the network device separately initiates detection for a non-talking call maintained for a long time on both parties.

Specifically, one terminal device may establish a call connection to another terminal device by using a network device such as a controller, a core network, or an LTE base station. A voice detector may be disposed on a network device, where the voice detector may execute detection for a non-talking call. The detection for a non-talking call may be: detecting, within a set time length range, whether a speech frame does not exist in uplink and downlink voice data of the terminal device with a voice service in a connected state.

Step S320: The network device detects whether a speech frame does not exist in uplink and downlink voice data.

If the network device detects that a speech frame does not exist in the uplink and downlink voice data, step S330 is executed; and if the voice detector of the network device detects that a speech frame exists in the uplink and downlink voice data, for example, a speech frame generated by speaking of any party, a process of the detection for a non-talking call continues to be executed.

Step S330: The network device starts a first timer to count time of a non-talking call. The first timer is configured to count time of a non-talking call in which a speech frame does not exist in the uplink and downlink voice data.

Step S340: The network device detects whether a speech frame does not exist in the uplink and downlink voice data. If the voice detector of the network device detects that a speech frame exists in the uplink and downlink voice data, the first timer is stopped and step S320 is executed again to start detection for a non-talking call; and if a speech frame does not exist in the uplink and downlink, the time of the non-talking call continues to be counted.

Step S350: The network device determines whether the time of the non-talking call counted by the first timer reaches a first threshold.

Specifically, the first threshold may be uniformly configured over an entire network or be configured by a user in a personalized manner, and a value of the first threshold may be a value of a set time length. If the time of the non-talking call counted by the first timer reaches the first threshold, for example, 10 minutes, step S360 is executed; and if the time of the non-talking call counted by the first timer does not reach the first threshold, step S340 continues to be executed.

Step S360: The network device ends a call between terminals.

It should be noted that, although the voice service control method is described by using an example in which a terminal device is connected to another terminal device by using a network device, a person skilled in the art can understand that there may be multiple terminal devices in connected states.

In the voice service control method according to this embodiment, a frame type of voice data is determined, and therefore, a voice service of a network device may be disconnected when no speech frame time exceeds set time, which prevents an economic loss caused by a non-talking call maintained for a long time, thereby saving a resource of an operator network, and improving utilization efficiency of the operator network.

Embodiment 4

Figure 4:
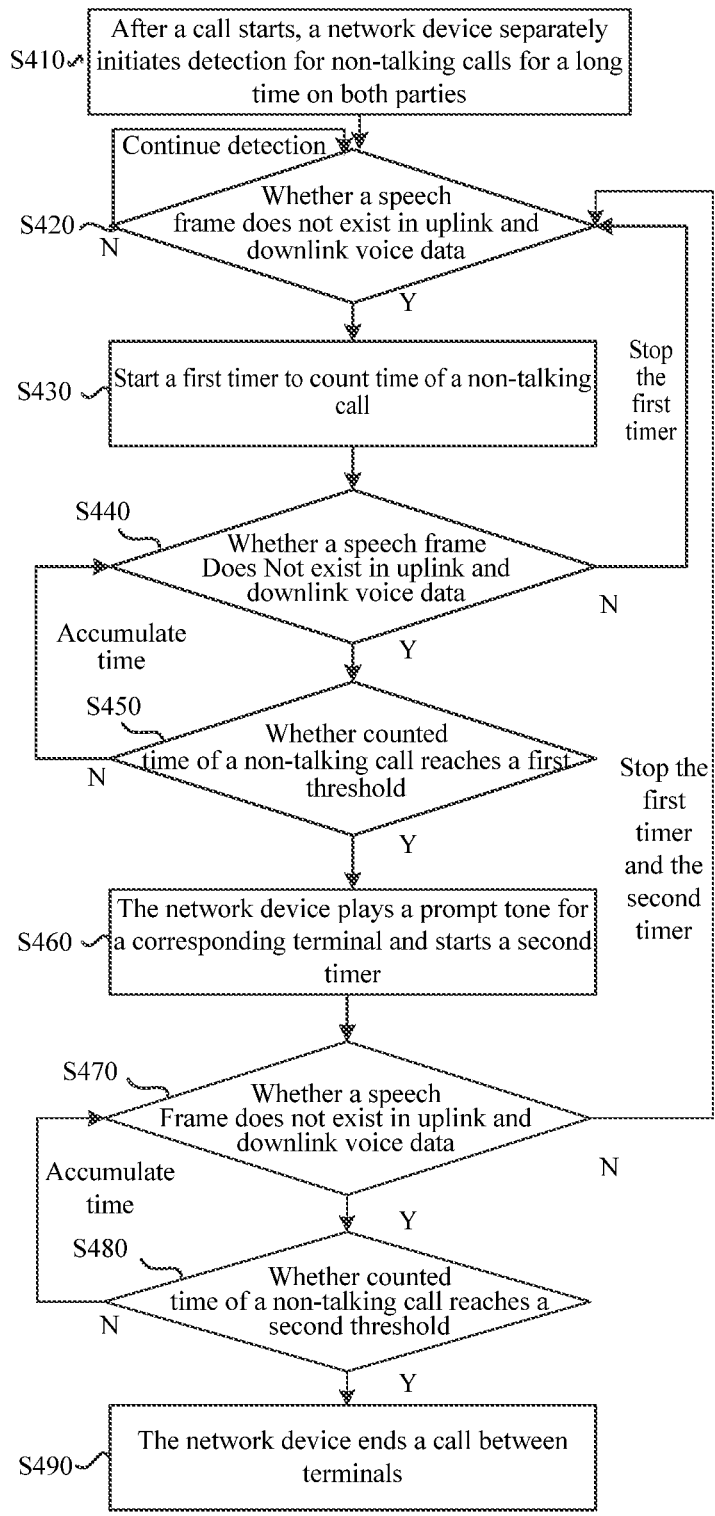
FIG. 4 is a flowchart of a voice service control method according to an embodiment.

FIG. 4 is a flowchart of a voice service control method according to an embodiment. Based on Embodiment 1, that the voice service control method is executed on the network device in Manner 2 is used as an example. As shown in FIG. 4, the voice service control method mainly includes:

Step S410: After a call starts, the network device separately initiates detection for a non-talking call maintained for a long time on both parties.

Step S420: The network device detects whether a speech frame does not exist in uplink and downlink voice data.

If the network device detects that a speech frame does not exist in the uplink and downlink voice data, step S430 is executed; and if a voice detector of the network device detects that a speech frame exists in the uplink and downlink voice data, for example, a speech frame generated by speaking of any party, a process of the detection for a non-talking call continues to be executed.

Step S430: The network device starts a first timer to count time. The first timer is configured to count time of a non-talking call in which a speech frame does not exist in the uplink and downlink voice data.

Step S440: The network device detects whether a speech frame does not exist in the uplink and downlink voice data.

If the voice detector of the network device may detect that a speech frame exists in the uplink and downlink voice data, for example, a speech frame generated by speaking of any party, the first timer is stopped and detection for a non-talking call in step S420 is executed again; and if a speech frame does not exist in the uplink and downlink voice data, the time of the non-talking call is counted.

Step S450: The network device determines whether the time of the non-talking call counted by the first timer reaches a first threshold.

Specifically, the first threshold may be uniformly configured over an entire network or may also be configured by a user, and the first threshold may be less than a set time length. If the time of the non-talking call counted by the first timer reaches the first threshold, for example, 7 minutes, step S460 is executed; and if the time of the non-talking call counted by the first timer does not reach the first threshold, step S440 continues to be executed.

Step S460: The network device plays a prompt tone for a corresponding terminal, and starts a second timer.

Specifically, after the time reaches the first threshold, if the voice detector of the network device detects that a speech frame does not exist in the uplink and downlink voice data all the time, the network device may send information about a prompt tone to each terminal device, to prompt each terminal device user that the device of the terminal device user is in a non-talking call state for a long time. The prompt tone may be a tick, and may also be a voice prompt, for example, "Because both parties are in a non-talking state for a long time, the call will be disconnected between both parties in XXX time." After the prompt tone is sent, the network device may start a second timer to count time. The second timer is also configured to count time in which a speech frame does not exist in the uplink and downlink voice data.

It should be noted that, although that a prompt tone is sent first is used as an example, a person skilled in the art can understand that, the network device may also start a second timer first, to count time in which a speech frame does not exist in the uplink and downlink voice data, and then send a prompt tone, to prompt a terminal device user that a non-talking call has been maintained for a long time.

Step S470: The network device detects whether a speech frame does not exist in the uplink and downlink voice data. If the network device detects that a speech frame does not exist in the uplink and downlink voice data, time of a non-talking call is counted. If the voice detector of the network device detects that a speech frame exists in the uplink and downlink voice data, for example, a speech frame generated by speaking of any party, the first timer and the second timer are stopped, time counted by both timers is returned to zero, and then step S420 is executed again to start detection for a non-talking call.

Step S480: The network device determines whether the time of the non-talking call counted by the second timer reaches a second threshold.

Specifically, the second threshold may be uniformly configured over an entire network or be configured by a user in a personalized manner, where the second threshold may be less than a set time length, and a sum of the first threshold and the second threshold may be equal to the set time. If the time of the non-talking call counted by the second timer reaches the second threshold, for example, 3 minutes, step S490 is executed; and if the time of the non-talking call counted by the second timer does not reach the second threshold, step S470 continues to be executed.

Step S490: The network device ends a call between terminals.

In the voice service control method according to this embodiment, a frame type of voice data is determined, and therefore, a voice service of a network device may be disconnected when no speech frame time exceeds set time, which prevents an economic loss caused by a non-talking call maintained for a long time, thereby saving a resource of an operator network, and improving utilization efficiency of the operator network.

Embodiment 5

Figure 5:
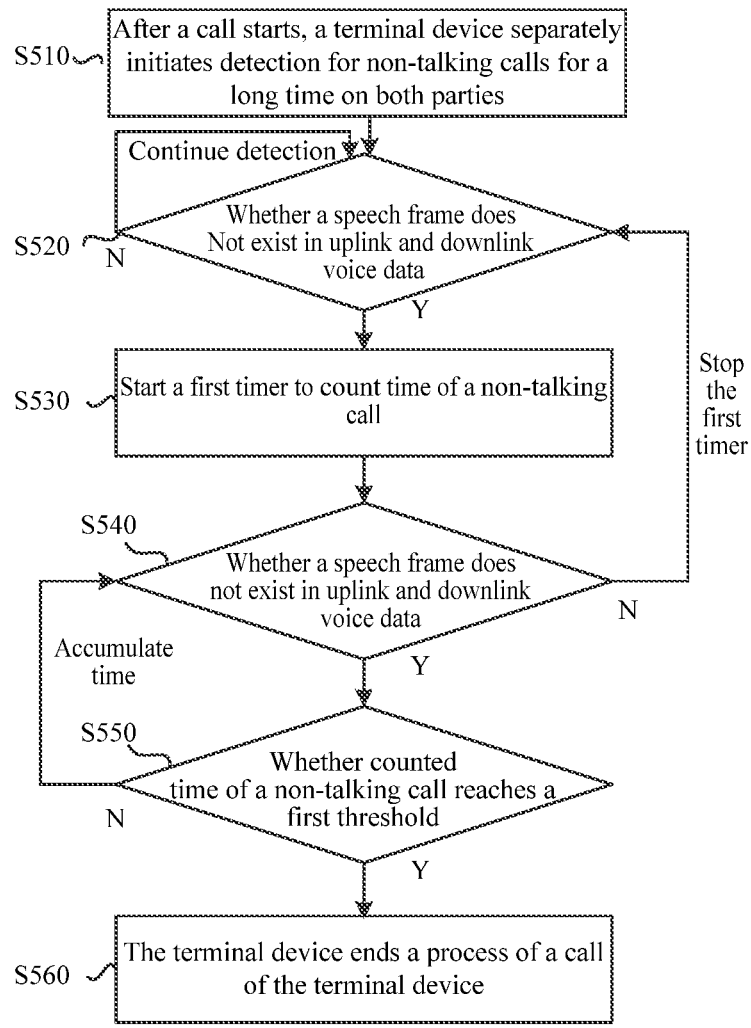
FIG. 5 is a flowchart of a voice service control method according to an embodiment.

FIG. 5 is a flowchart of a voice service control method according to an embodiment. Based on Embodiment 2, that the voice service control method is executed on the terminal device in Manner 1 is used as an example. As shown in FIG. 5, the voice service control method mainly includes:

Step S510: After a call starts, the terminal device separately initiates detection for a non-talking call maintained for a long time on both parties.

Specifically, one terminal device, for example, a mobile phone or a landline phone may establish a call connection to another terminal device by using a network device such as a controller, a core network or an LTE base station. A voice detector may be disposed on a terminal device, where the voice detector may execute detection for a non-talking call. The detection for a non-talking call may be: detecting, within a set time length range, whether a speech frame does not exist in uplink and downlink voice data of the terminal device in a connected state.

Step S520: The terminal device detects whether a speech frame does not exist in uplink and downlink voice data. If the terminal device detects that a speech frame does not exist in the uplink and downlink voice data, step S530 is executed; and if the voice detector of the terminal device detects that a speech frame exists in the uplink and downlink voice data, for example, a speech frame generated by speaking of any party, a process of the detection continues to be executed.

Step S530: The terminal device starts a first timer to count time of a non-talking call. The first timer is configured to count time of a non-talking call in which a speech frame does not exist in the uplink and downlink voice data.

Step S540: The terminal device detects whether a speech frame does not exist in the uplink and downlink voice data. If the terminal device detects that a speech frame does not exist in the uplink and downlink voice data, the terminal device continues to execute the process of the detection and counts the time of the non-talking call; and if the voice detector of the terminal device detects that a speech frame exists in the uplink and downlink voice data, for example, a speech frame generated by speaking of any party, detection for a non-talking call in step S520 starts to be executed again.

Step S550: The terminal device determines whether the time of the non-talking call counted by the first timer reaches a first threshold.

Specifically, the first threshold may be uniformly configured over an entire network or be configured by a user in a personalized manner, and a value of the first threshold may be a value of a set time length. If the time of the non-talking call counted by the first timer reaches the first threshold, for example, 10 minutes, step S560 is executed; and if the time of the non-talking call counted by the first timer does not reach the first threshold, step S540 continues to be executed.

Step S560: The terminal device ends a process of a call of the terminal device.

It should be noted that, although the voice service control method is described by using an example in which a terminal device is connected to another terminal device by using a network device, a person skilled in the art can understand that there may be multiple terminal devices in connected states.

In the voice service control method according to this embodiment, a frame type of voice data is determined, and therefore, a voice service of a terminal device may be disconnected when no speech frame time exceeds set time, which prevents an economic loss caused by a non-talking call maintained for a long time, thereby saving a resource of an operator network, and improving utilization efficiency of the operator network.

Embodiment 6

Figure 6:
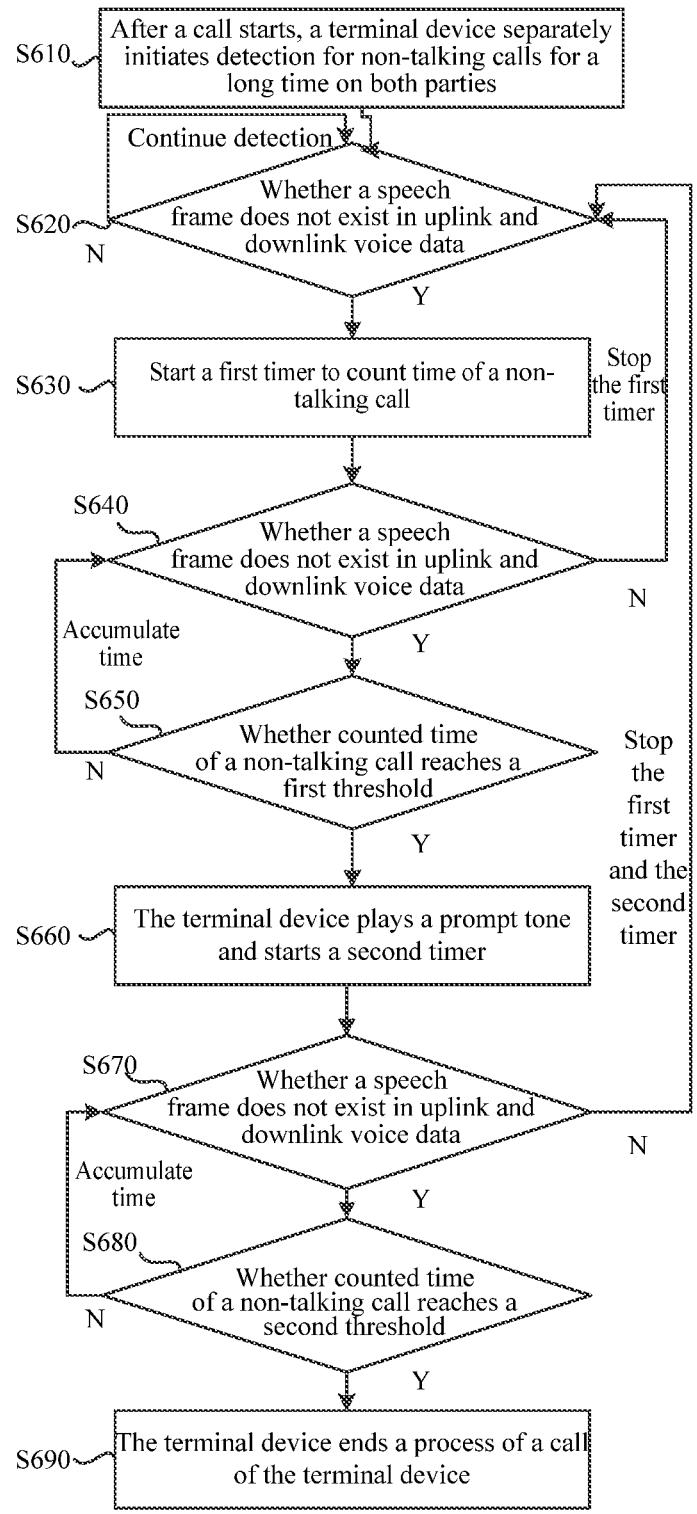
FIG. 6 is a flowchart of a voice service control method according to an embodiment.

FIG. 6 is a flowchart of a voice service control method according to an embodiment. Based on Embodiment 2, that the voice service control method is executed on the terminal device in Manner 2 is used as an example. As shown in FIG. 6, the voice service control method mainly includes:

Step S610: After a call starts, the terminal device separately initiates detection for a non-talking call maintained for a long time on both parties.

Step S620: The terminal device detects whether a speech frame does not exist in uplink and downlink voice data. If the terminal device detects that a speech frame does not exist in the uplink and downlink voice data, step S630 is executed; and if the voice detector detects that a speech frame exists, for example, a speech frame generated by speaking of any party, a process of the detection continues to be executed.

Step S630: The terminal device starts a first timer to count time of a non-talking call. The first timer is configured to count time of a non-talking call in which a speech frame does not exist in the uplink and downlink voice data.

Step S640: The terminal device detects whether a speech frame does not exist in the uplink and downlink voice data.

If the voice detector of the terminal device may detect that a speech frame exists in the uplink and downlink voice data, for example, a speech frame generated by speaking of any party, the first timer is stopped and step S620 is to executed again to start detection for a non-talking call; and if a speech frame does not exist in the uplink and downlink voice data, the time of the non-talking call may continue to be counted.

Step S650: The terminal device determines whether the time of the non-talking call counted by the first timer reaches a first threshold.

Specifically, the first threshold may be uniformly configured over an entire network or be configured by a user in a personalized manner, and a value of the first threshold may be a value of a set time length. If the time of the non-talking call counted by the first timer reaches the first threshold, for example, 10 minutes, step S660 is executed; and if the time of the non-talking call counted by the first timer does not reach the first threshold, step S640 continues to be executed.

Step S660: The terminal device plays a prompt tone and starts a second timer.

Specifically, after the time reaches the first threshold, if the voice detector of the terminal device detects that a speech frame does not exist in the uplink and downlink voice data all the time, each device user may be prompted that the terminal device of the device user is in a non-talking call state for a long time, or only a user of the terminal device is prompted that the terminal device of the user is in a non-talking call state for a long time. The prompt may be a tick played by a loudspeaker, may also be a voice prompt, for example, "Because both parties are in a non-talking state for a long time, the call will be disconnected between both parties in XXX time," and may also be indicator blinking or a vibration prompt made by a machine. After the prompt is sent, the terminal device may start a second timer, where the second timer is also configured to count time in which a speech frame does not exist in the uplink and downlink voice data all the time.

It should be noted that, although that the terminal device sends a prompt first is used as an example, a person skilled in the art can understand that, the terminal device may also start a second timer first, to count time in which a speech frame does not exist in the uplink and downlink voice data, and then send a prompt, which is used to prompt a user that a non-talking call has been maintained for a long time.

Step S670: The terminal device detects whether a speech frame does not exist in the uplink and downlink voice data. If the terminal device detects that a speech frame does not exist in the uplink and downlink voice data, time of a non-talking call is counted. If the voice detector of the terminal device detects that a speech frame exists in the uplink and downlink voice data, for example, a speech frame generated by speaking of any party, the first timer and the second timer are stopped, time counted by both timers is returned to zero, and then step S620 is executed again to start detection for a non-talking call.

Step S680: The terminal device determines whether the time of the non-talking call counted by the second timer reaches a second threshold.

Specifically, the second threshold may be uniformly configured when the terminal device is delivered from a factory or be configured by a user in a personalized manner, where the second threshold may be less than a set time length, and a sum of the first threshold and the second threshold may be equal to the set time. If the time of the non-talking call counted by the second timer reaches the second threshold, for example, 3 minutes, step S690 is executed; and if the time of the non-talking call counted by the second timer does not reach the second threshold, step S670 continues to be executed.

Step S690: The terminal device ends a process of a call of the terminal device.

In the voice service control method according to this embodiment, a frame type of voice data is determined, and therefore, a voice service of a terminal device may be disconnected when no speech frame time exceeds set time, which prevents an economic loss caused by a non-talking call maintained for a long time, thereby saving a resource of an operator network, and improving utilization efficiency of the operator network.

Embodiment 7

Figure 7:
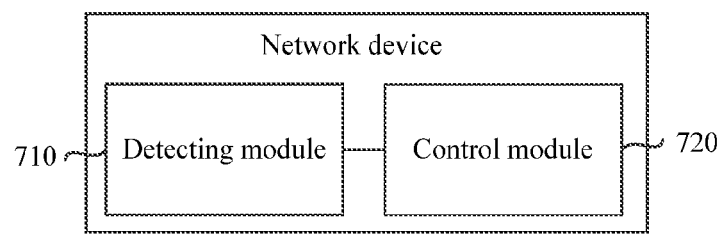
FIG. 7 is a structural block diagram of a network device according to an embodiment.

FIG. 7 is a structural block diagram of a network device according to an embodiment. As shown in FIG. 7, the network device mainly includes:

a detecting module 710, configured to detect, within a set time length range, whether a speech frame exists in uplink and downlink voice data of a terminal device with a voice service in a connected state; and a control module 720, communicating with the detecting module 710 and configured to: in a case in which the detecting module 710 detects that the speech frame does not exist in the uplink and downlink voice data within the set time length range, disconnect from the voice service of the terminal device.

Specifically, on a communications network that supports a DTX function, a terminal device in a call connected state may send multiple types of frames, for example, a speech frame, a null frame, and a silence insertion descriptor. The terminal device or the network device (for example, a controller, a core network, or an LTE base station) may initiate detection for a non-talking call; and after it is detected that silence suppression starts, the terminal device or the network device may send a non-speech frame such as a silence insertion descriptor or a null frame. For diagrams of sending time sequences of a silence insertion descriptor, a null frame, and the like, reference may be made to description of Embodiment 1, and details are not repeatedly described herein.

In the network device according to this embodiment, a frame type of voice data is determined, and therefore, a voice service of the network device may be disconnected when no speech frame time exceeds set time, which prevents an economic loss caused by a non-talking call maintained for a long time, thereby saving a resource of an operator network, and improving utilization efficiency of the operator network.

Embodiment 8

Figure 8:
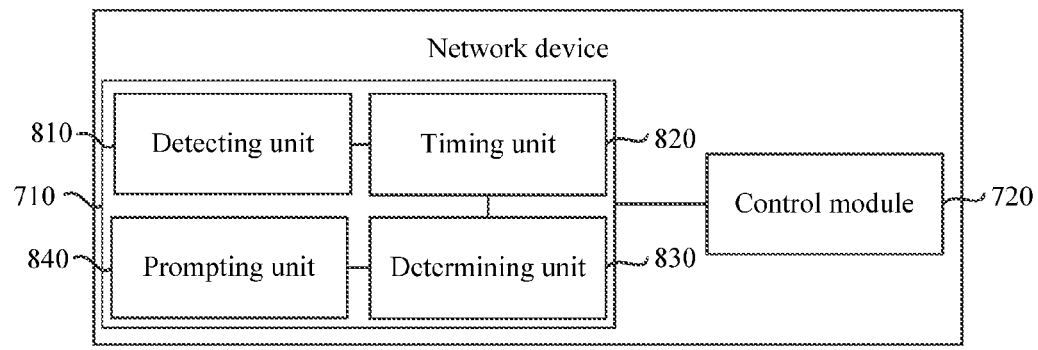
FIG. 8 is a structural block diagram of a network device according to an embodiment.

FIG. 8 is a structural block diagram of a network device according to an embodiment. A component, which is shown in FIG. 8, with a same numeral as that of a component in FIG. 7 has a same function. For brevity, detailed descriptions of these components are omitted.

As shown in FIG. 8, a difference between the network device shown in FIG. 8 and the network device shown in FIG. 7 mainly lies in:

The detecting module 710 includes:

a detecting unit 810, configured to: when the voice service of the terminal device starts, detect the uplink and downlink voice data;

a timing unit 820, communicating with the detecting unit 810 and configured to: in a case in which the detecting unit 810 detects that the speech frame does not exist in the uplink and downlink voice data, start a first timer, where the first timer is configured to count time in which the speech frame does not exist in the uplink and downlink voice data; and a determining unit 830, communicating with the timing unit 820 and configured to determine whether first cumulative time of the first timer started by the timing unit 820 exceeds a first threshold.

The control module 720 is specifically configured to: in a case in which the determining unit 830 determines that the first cumulative time exceeds the first threshold, disconnect from the voice service of the terminal device.

The detecting module 710 further includes:

a prompting unit 840, communicating with the determining unit 830 and configured to: in a case in which the determining unit 830 determines that the first cumulative time exceeds the first threshold, play a prompt tone and start a second timer, where the second timer is configured to count time in which the speech frame does not exist in the uplink and downlink voice data of the terminal device and a prompt has been made;

the determining unit 830 is further configured to determine whether second cumulative time of the second timer started by the timing unit 820 exceeds a second threshold; and the control module 720 is further configured to: in a case in which the determining unit 830 determines that the second cumulative time exceeds the second threshold, disconnect from the voice service of the terminal device.

In the network device according to this embodiment, a frame type of voice data is determined, and therefore, a voice service of the network device may be disconnected when no speech frame time exceeds set time, which prevents an economic loss caused by a non-talking call maintained for a long time, thereby saving a resource of an operator network, and improving utilization efficiency of the operator network.

Embodiment 9

Figure 9:
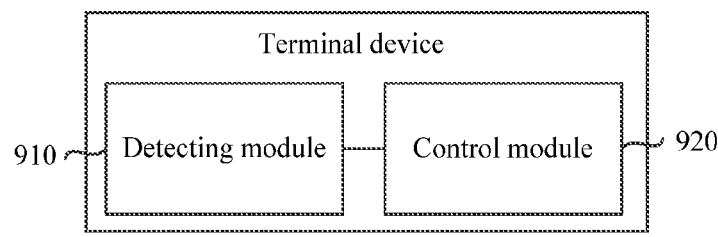
FIG. 9 is a structural block diagram of a terminal device according to an embodiment.

FIG. 9 is a structural block diagram of a terminal device according to an embodiment. As shown in FIG. 9, the terminal device mainly includes:

a detecting module 910, configured to detect, within a set time length range, whether a speech frame exists in uplink and downlink voice data of the terminal device with a voice service in a connected state; and a control module 920, communicating with the detecting module 910 and configured to: in a case in which the detecting module 910 detects that the speech frame does not exist in the uplink and downlink voice data within the set time length range, disconnect from the voice service.

In the terminal device according to this embodiment, a frame type of voice data is determined, and therefore, a voice service of the terminal device may be disconnected when no speech frame time exceeds set time, which prevents an economic loss caused by a non-talking call maintained for a long time, thereby saving a resource of an operator network, and improving utilization efficiency of the operator network.

Embodiment 10

Figure 10:
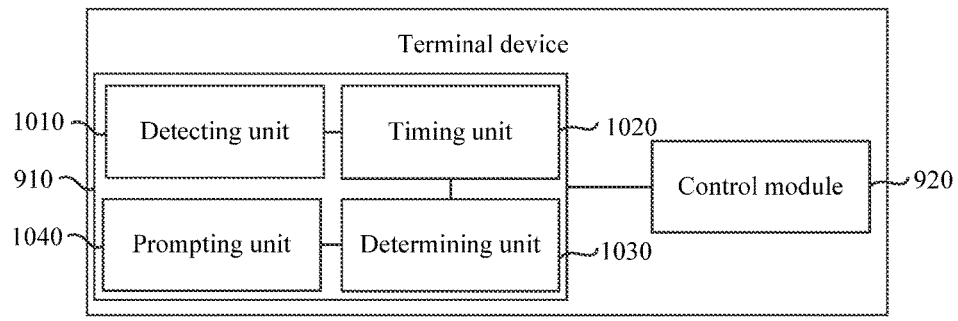
FIG. 10 is a structural block diagram of a terminal device according to an embodiment.

FIG. 10 is a structural block diagram of a terminal device according to an embodiment. A component, which is shown in FIG. 10, with a same numeral as that of a component in FIG. 9 has a same function. For brevity, detailed descriptions of these components are omitted.

As shown in FIG. 10, a difference between the terminal device shown in FIG. 10 and the terminal device shown in FIG. 9 mainly lies in:

The detecting module 910 includes:

a detecting unit 1010, configured to: when the voice service starts, detect the uplink and downlink voice data;

a timing unit 1020, communicating with the detecting unit 1010 and configured to: in a case in which the detecting unit 1010 detects that the speech frame does not exist in the uplink and downlink voice data, start a first timer, where the first timer is configured to count time in which the speech frame does not exist in the uplink and downlink voice data; and a determining unit 1030, communicating with the timing unit 1020 and configured to determine whether first cumulative time of the first timer started by the timing unit 1020 exceeds a first threshold.

The control module 920 is specifically configured to:

in a case in which the determining unit determines that the first cumulative time exceeds the first threshold, disconnect from the voice service of the terminal device.

The detecting module 910 further includes:

a prompting unit 1040, communicating with the determining unit 1030 and configured to: in a case in which the determining unit 1030 determines that the first cumulative time exceeds the first threshold, play a prompt tone and instruct the timing unit 1020 to start a second timer, where the second timer is configured to count time in which the speech frame does not exist in the uplink and downlink voice data and a prompt has been made, where the determining unit 1030 is further configured to determine whether second cumulative time of the second timer started by the timing unit 1020 exceeds a second threshold; and the control module 920 is further configured to: in a case in which the determining unit 1030 determines that the second cumulative time exceeds the second threshold, disconnect from the voice service.

In the terminal device according to this embodiment, a frame type of voice data is determined, and therefore, a voice service of the terminal device may be disconnected when no speech frame time exceeds set time, which prevents an economic loss caused by a non-talking call maintained for a long time, thereby saving a resource of an operator network, and improving utilization efficiency of the operator network.

Embodiment 11

Figure 11:
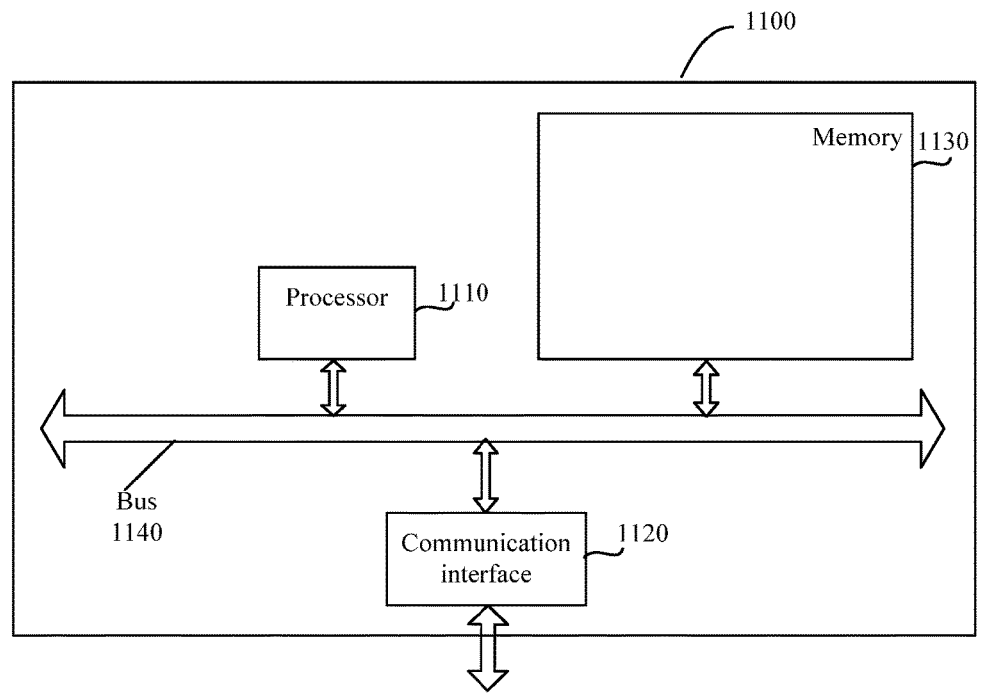
FIG. 11 is a structural block diagram of a network device according to an embodiment.

FIG. 11 is a structural block diagram of a network device according to an embodiment. A network device 1100 may be a host server, a personal computer PC, or a portable computer or terminal that can be carried, or the like, where all of the devices have a computing capability. A specific implementation of a computing node is not limited in a specific embodiment.

The network device 1100 includes a processor (processor) 1110, a communication interface (Communication Interface) 1120, a memory (memory) 1130, and a bus 1140. The processor 1110, the communication interface 1120, and the memory 1130 communicate with each other by using the bus 1140.

The communication interface 1120 is configured to communicate with a network device, where the network device includes, for example, a virtual machine management center, or shared storage.

The processor 1110 is configured to execute a program. The processor 1110 may be a central processing unit CPU, or an application specific integrated circuit ASIC (Application Specific Integrated Circuit), or may be configured to one or more integrated circuits that implement one or more embodiment.

The memory 1130 is used to store a file. The memory 1130 may include a high speed RAM memory, and may further include a non-volatile memory (non-volatile memory), for example, at least one magnetic disk memory. The memory 1130 may also be a memory array. The memory 1130 may also be divided into blocks, and the blocks can be combined into a virtual volume according to a specific rule.

In a possible implementation manner, the foregoing program may be program code that includes a computer operation instruction. The program may be specifically used to execute the following steps:

detecting, by a network device, within a set time length range, whether a speech frame exists in uplink and downlink voice data of a terminal device with a voice service in a connected state; and disconnecting, by the network device, from the voice service of the terminal device in a case in which the speech frame does not exist in the uplink and downlink voice data within the set time length range.

In a possible implementation manner, the detecting, by a network device, within a set time length range, whether a speech frame exists in uplink and downlink voice data of a terminal device with a voice service in a connected state includes:

detecting, by the network device, the uplink and downlink voice data when the voice service of the terminal device starts;

starting, by the network device, a first timer in a case in which the speech frame does not exist in the uplink and downlink voice data, where the first timer is configured to count time in which the speech frame does not exist in the uplink and downlink voice data; and determining whether first cumulative time of the first timer exceeds a first threshold.

In a possible implementation manner, the disconnecting, by the network device, from the voice service of the terminal device in a case in which the speech frame does not exist in the uplink and downlink voice data within the set time length range includes:

disconnecting, by the network device, from the voice service of the terminal device in a case in which the first cumulative time exceeds the first threshold.

In a possible implementation manner, the detecting, by a network device, within a set time length range, whether a speech frame exists in uplink and downlink voice data of a terminal device with a voice service in a connected state further includes:

playing, by the network device, a prompt tone and starting a second timer in a case in which the first cumulative time exceeds the first threshold, where the second timer is configured to count time in which the speech frame does not exist in the uplink and downlink voice data and a prompt has been made; and determining, by the network device, whether second cumulative time of the second timer exceeds a second threshold; and the disconnecting, by the network device, from the voice service of the terminal device in a case in which the speech frame does not exist in the uplink and downlink voice data within the set time length range includes:

disconnecting, by the network device, from the voice service of the terminal device in a case in which the second cumulative time exceeds the second threshold.

In the network device according to this embodiment, a frame type of voice data is determined, and therefore, a voice service of the network device may be disconnected when no speech frame time exceeds set time, which prevents an economic loss caused by a non-talking call maintained for a long time, thereby saving a resource of an operator network, and improving utilization efficiency of the operator network.

Embodiment 12

Figure 12:
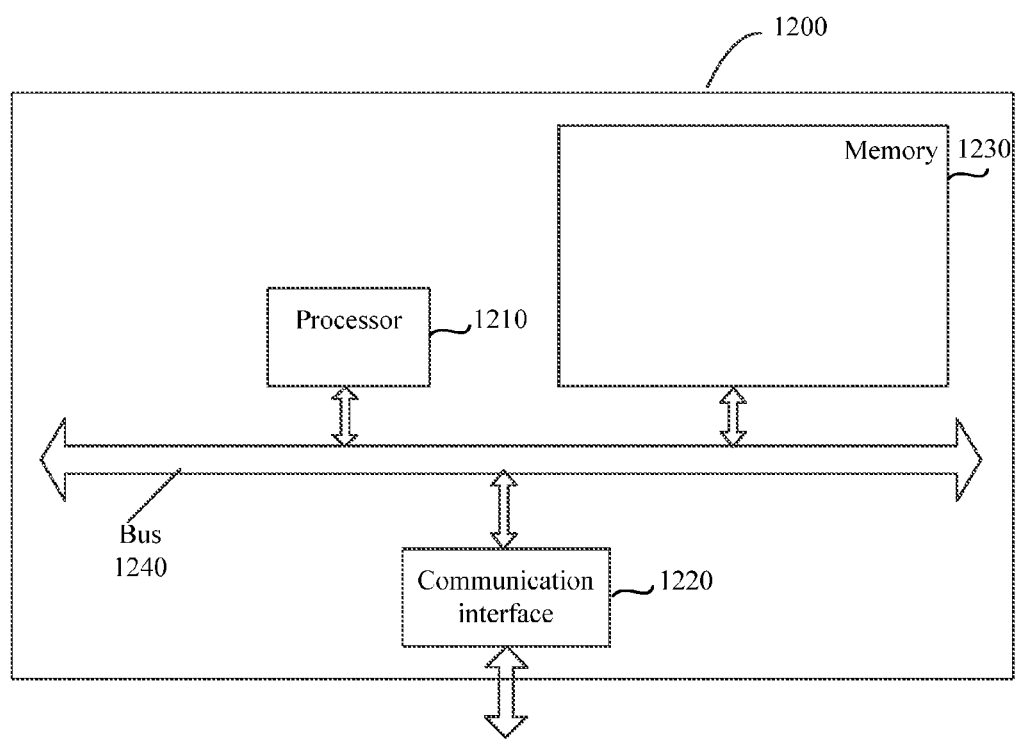
FIG. 12 is a structural block diagram of a terminal device according to an embodiment.

FIG. 12 is a structural block diagram of a terminal device according to an embodiment. A specific implementation of a computing node is not limited in a specific embodiment.

The terminal device 1200 includes a processor (processor) 1210, a communication interface (Communication Interface) 1220, a memory (memory) 1230, and a bus 1240. The processor 1210, the communication interface 1220, and the memory 1230 communicate with each other by using the bus 1240.

The communication interface 1220 is configured to communicate with a network device, where the network device includes, for example, a virtual machine management center, or shared storage.

The processor 1210 is configured to execute a program. The processor 1210 may be a central processing unit CPU, or an application specific integrated circuit ASIC (Application Specific Integrated Circuit), or may be configured to one or more integrated circuits that implement one or more embodiments.

The memory 1230 is used to store a file. The memory 1230 may include a high speed RAM memory, and may further include a non-volatile memory (non-volatile memory), for example, at least one magnetic disk memory. The memory 1230 may also be a memory array. The memory 1230 may also be divided into blocks, and the blocks can be combined into a virtual volume according to a specific rule.

In a possible implementation manner, the foregoing program may be program code that includes a computer operation instruction. The program may be specifically used to execute the following steps:

detecting, by a terminal device, within a set time length range, whether a speech frame exists in uplink and downlink voice data of the terminal device with a voice service in a connected state; and disconnecting, by the terminal device, from the voice service in a case in which the speech frame does not exist in the uplink and downlink voice data within the set time length range.

In a possible implementation manner, the detecting, by a terminal device, within a set time length range, whether a speech frame exists in uplink and downlink voice data of the terminal device with a voice service in a connected state includes:

detecting, by the terminal device, the uplink and downlink voice data when the voice service starts;

starting, by the terminal device, a first timer in a case in which the speech frame does not exist in the uplink and downlink voice data, where the first timer is configured to count time in which the speech frame does not exist in the uplink and downlink voice data; and determining, by the terminal device, whether first cumulative time of the first timer exceeds a first threshold.

In a possible implementation manner, the disconnecting, by the terminal device, from the voice service in a case in which the speech frame does not exist in the uplink and downlink voice data within the set time length range includes:

disconnecting, by the terminal device, from the voice service in a case in which the first cumulative time exceeds the first threshold.

In a possible implementation manner, the detecting, by a terminal device, within a set time length range, whether a speech frame exists in uplink and downlink voice data of the terminal device with a voice service in a connected state includes:

playing, by the terminal device, a prompt tone and starting a second timer in a case in which the first cumulative time exceeds the first threshold, where the second timer is configured to count time in which the speech frame does not exist in the uplink and downlink voice data of the terminal device and a prompt has been made; and determining, by the terminal device, whether second cumulative time of the second timer exceeds a second threshold; and the disconnecting, by the terminal device, from the voice service in a case in which the speech frame does not exist in the uplink and downlink voice data within the set time length range includes:

disconnecting, by the terminal device, from the voice service in a case in which the second cumulative time exceeds the second threshold.

In the terminal device according to this embodiment, a frame type of voice data is determined, and therefore, a voice service of the terminal device may be disconnected when no speech frame time exceeds set time, which prevents an economic loss caused by a non-talking call maintained for a long time, thereby saving a resource of an operator network, and improving utilization efficiency of the operator network.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may use different methods to implement the described functions for a particular application, but it should not be considered that the implementation goes beyond the scope of the disclosed embodiments.

If the functions are implemented in a form of computer software and are sold or used as independent products, it can be considered to a certain extent that all or a part (for example, the part contributing to the prior art) of the embodiments is implemented in a form of a computer software product. The computer software product is stored in a non-volatile storage medium, and includes several instructions for instructing a computer device (which may be a personal computer, a server, a network device, or the like) to perform all or a part of the steps of the methods provided in the embodiments. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific described implementation manners, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network device, comprising:
    a system bus;
    a communication interface;
    a processor configured to cause the network device to communicate with a terminal device; and
    a non-transitory computer-readable storage medium storing a program to be executed by the processor, wherein the processor, the communication interface, and the non-transitory computer readable medium communicate using the system bus, the program including instructions for:
    detecting, by the network device, within a preset time period, whether a speech frame exists in uplink and downlink voice data of the terminal device with a voice service in a connected state, wherein the instructions for detecting whether the speech frame exists in uplink and downlink voice data include instructions for:
    starting, by the network device, a first timer in response to the speech frame not existing in the uplink and downlink voice data, where the first timer is configured to count a first time in which the speech frame does not exist in the uplink and downlink voice data; and
        playing, by the network device, a prompt tone and starting a second timer in response to the first time exceeding a first threshold, wherein the second timer is configured to count a second time in which the speech frame does not exist in the uplink and downlink voice data and a prompt has been made; and
    disconnecting, by the network device, from the voice service of the terminal device in response to the speech frame not existing, within the preset time period, in at least one of the uplink and downlink voice data, and further in response to a frame type other than a speech frame existing, within the preset time period, in the at least one of the uplink and downlink voice data, and further in response to the second time exceeding the second threshold.

2. The network device according to claim 1, wherein the instructions for the detecting whether a speech frame exists in the uplink and downlink voice data of the terminal device with the voice service in the connected state further includes instructions for:
    detecting, by the network device, the uplink and downlink voice data when the voice service of the terminal device starts; and
    determining, by the network device, whether the first time exceeds the first threshold.

3. The network device according to claim 2, wherein the instructions for the disconnecting from the voice service of the terminal device includes instructions for:
    disconnecting, by the network device, from the voice service of the terminal device further in response to the first time exceeding the first threshold.

4. The network device according to claim 2, wherein the instructions for the detecting whether the speech frame exists in uplink and downlink voice data of the terminal device with the voice service in the connected state includes instructions for:
    determining, by the network device, whether second time exceeds a second threshold.

5. A terminal device, comprising:
    a system bus;
    a communication interface;
    a processor configured to cause the terminal device to communicate with a network device; and
    a non-transitory computer-readable storage medium storing a program to be executed by the processor, wherein the processor, the communication interface, and the non-transitory computer readable medium communicate using the system bus, the program including instructions for:
    detecting, by the terminal device, within a preset time period, whether a speech frame exists in uplink and downlink voice data of the terminal device with a voice service in a connected state;
    receiving, from the network device, information about a first prompt tone indicating that the network device detects that a speech frame does not exist in the uplink and downlink voice data for a network device time that exceeds a first network device threshold;
    playing a first prompt tone in response to receiving the information about the first prompt tone, the first prompt tone prompting a terminal device user that the terminal device is in a non-talking call state; and
    disconnecting, by the terminal device, from the voice service in response to the speech frame not existing in the uplink and downlink voice data within the preset time period, and further in response to a frame type other than a speech type frame existing in the uplink and downlink voice data within the preset time period.

6. The terminal device according to claim 5, wherein the instructions for the detecting whether the speech frame exists in the uplink and downlink voice data of the terminal device with the voice service in the connected state, comprises:
  detecting, by the terminal device, the uplink and downlink voice data when the voice service starts;
  starting, by the terminal device, a first timer in response to the speech frame not existing in the uplink and downlink voice data, wherein the first timer is configured to count time in which the speech frame does not exist in the uplink and downlink voice data; and
  determining, by the terminal device, whether first cumulative time of the first timer exceeds a first threshold.

7. The terminal device according to claim 6, wherein the instructions for the disconnecting, from the voice service in response to the speech frame not existing in the uplink and downlink voice data within the preset time period, includes instructions for:
  disconnecting, by the terminal device, from the voice service in response to the first time exceeding the first threshold.

8. The terminal device according to claim 6, wherein the instructions for the detecting whether the speech frame exists in the uplink and downlink voice data of the terminal device with the voice service in the connected state comprises:
  playing, by the terminal device, a second prompt tone and starting a second timer in a case in which the first cumulative time exceeds the first threshold, where the second timer is configured to count a second time in which the speech frame does not exist in the uplink and downlink voice data of the terminal device and a second prompt has been made; and
  determining, by the terminal device, whether second time exceeds a second threshold; and
  wherein the instructions for the disconnecting from the voice service in response to the speech frame not existing in the uplink and downlink voice data within the preset time period, includes instructions for disconnecting, by the terminal device, from the voice service in response to the second time exceeding the second threshold.

9. A voice service control method, comprising:
  detecting, by a network device, within a preset time period, whether a speech frame exists in uplink and downlink voice data of a terminal device with a voice service in a connected state, wherein the detecting whether the speech frame exists in the uplink and downlink voice data comprises:
  starting, by the network device, a first timer in response to the speech frame not existing in the uplink and downlink voice data, where the first timer is configured to count a first time in which the speech frame does not exist in the uplink and downlink voice data; and
  playing, by the network device, a prompt tone and starting a second timer in response to the first time exceeding a first threshold, wherein the second timer is configured to count a second time in which the speech frame does not exist in the uplink and downlink voice data and a prompt has been made; and
  disconnecting, by the network device, from the voice service of the terminal device in response to the speech frame not existing in the uplink and downlink voice data within the preset time period, and further in response to a frame type other than a speech type frame existing in the uplink and downlink voice data within the preset time period, and further in response to the second time exceeding the second threshold.

10. The voice service control method according to claim 9, wherein the detecting whether the speech frame exists in the uplink and downlink voice data of the terminal device with the voice service in the connected state further comprises:
  detecting, by the network device, the uplink and downlink voice data when the voice service of the terminal device starts; and
  determining whether first time exceeds a first threshold.

11. The voice service control method according to claim 10, wherein the disconnecting from the voice service of the terminal device in response to the speech frame not existing in the uplink and downlink voice data within the preset time period comprises:
  disconnecting, by the network device, from the voice service of the terminal device further in response to the first time exceeding the first threshold.

12. The voice service control method according to claim 10, wherein the detecting whether the speech frame exists in the uplink and downlink voice data of the terminal device with the voice service in the connected state further comprises:
  determining, by the network device, whether second cumulative time of the second timer exceeds a second threshold.

13. A voice service control method, comprising:
  detecting, by a terminal device, within a preset time period, whether a speech frame exists in uplink and downlink voice data of the terminal device with a voice service in a connected state;
  receiving, from a network device, information about a first prompt tone indicating that the network device detects that a speech frame does not exist in the uplink and downlink voice data for a network device time that exceeds a first network device threshold;
  playing a first prompt tone in response to receiving the information about the first prompt tone, the first prompt tone prompting a terminal device user that the terminal device is in a non-talking call state; and
  disconnecting, by the terminal device, from the voice service in response to the speech frame not existing in the uplink and downlink voice data within the preset time period, and further in response to a frame type other than a speech type frame existing in the uplink and downlink voice data within the preset time period.

14. The voice service control method according to claim 13, wherein the detecting whether the speech frame exists in the uplink and downlink voice data of the terminal device with the voice service in the connected state comprises:
  detecting, by the terminal device, the uplink and downlink voice data when the voice service starts;
  starting, by the terminal device, a first timer in response to the speech frame not existing in the uplink and downlink voice data, wherein the first timer is configured to count a first time in which the speech frame does not exist in the uplink and downlink voice data; and
  determining, by the terminal device, whether first time of the first timer exceeds a first threshold.

15. The voice service control method according to claim 14, wherein the disconnecting, by the terminal device, from the voice service in response to the speech frame not existing in the uplink and downlink voice data within the preset time period comprises:
  disconnecting, by the terminal device, from the voice service in response to the first time exceeding the first threshold.

16. The voice service control method according to claim 14, wherein the detecting whether the speech frame exists in the uplink and downlink voice data of the terminal device with the voice service in the connected state further comprises:
- playing, by the terminal device, a second prompt tone and starting a second timer in response to the first time exceeding the first threshold, wherein the second timer is configured to count a second time in which the speech frame does not exist in the uplink and downlink voice data of the terminal device and the second prompt has been made; and
- determining, by the terminal device, whether the second time of the second timer exceeds a second threshold; and
- wherein the disconnecting, by the terminal device, from the voice service in response to the speech frame not existing in the uplink and downlink voice data within the preset time period comprises:
- disconnecting, by the terminal device, from the voice service in response to the second time exceeding the second threshold.

\* \* \* \* \*